United States Patent
Dahl et al.

(10) Patent No.: US 10,859,150 B2
(45) Date of Patent: Dec. 8, 2020

(54) AIR-GUIDING DEVICE

(71) Applicant: Dr. Ing. h.c. F. Porsche Aktiengesellschaft, Stuttgart (DE)

(72) Inventors: Benno Dahl, Stuttgart (DE); Thomas Wolf, Leonberg (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 16/131,064

(22) Filed: Sep. 14, 2018

(65) Prior Publication Data

US 2019/0107192 A1   Apr. 11, 2019

(30) Foreign Application Priority Data

Oct. 11, 2017 (DE) .................. 10 2017 123 629

(51) Int. Cl.
  *F16H 57/04* (2010.01)
  *F16H 57/02* (2012.01)

(52) U.S. Cl.
  CPC ........... *F16H 57/0416* (2013.01); *F16H 2057/02026* (2013.01); *F16H 2057/02043* (2013.01)

(58) Field of Classification Search
  CPC ....... F16H 57/0416; F16H 2057/02026; F16H 2057/02043
  See application file for complete search history.

(56) References Cited

U.S. PATENT DOCUMENTS

| | | | | |
|---|---|---|---|---|
| 1,653,427 A | * | 12/1927 | Beebee | F01M 5/002 184/104.3 |
| 2,214,321 A | * | 9/1940 | Browne | F02F 1/34 123/41.67 |
| 2,325,647 A | * | 7/1943 | Adamson | F16H 57/0415 165/185 |
| 4,848,453 A | * | 7/1989 | Evans | F16H 57/0415 165/44 |
| 5,585,681 A | | 12/1996 | Bitsche | |
| 5,927,384 A | | 7/1999 | Waldner, Jr. | |
| 8,672,094 B2 | * | 3/2014 | Quehenberger | F16H 57/0419 184/6.12 |
| 2005/0051372 A1 | * | 3/2005 | Guertler | B60K 11/06 180/68.1 |
| 2009/0173184 A1 | | 7/2009 | Beutler et al. | |
| 2017/0190364 A1 | | 7/2017 | Fahland et al. | |
| 2017/0267094 A1 | | 9/2017 | Pfeiffer et al. | |

(Continued)

FOREIGN PATENT DOCUMENTS

| | | | | |
|---|---|---|---|---|
| DE | 3026876 A1 | * | 2/1982 | ............ B60K 11/00 |
| DE | 4417432 A1 | | 12/1994 | |
| DE | 10341642 B3 | | 4/2005 | |

(Continued)

OTHER PUBLICATIONS

Translation DE-3026876.*

*Primary Examiner* — Vicky A Johnson
(74) *Attorney, Agent, or Firm* — Leydig, Voit & Mayer, Ltd.

(57) ABSTRACT

A device for cooling a transmission unit having front cooling fins and rear cooling fins includes a front air guiding blade and a rear air guiding blade. The front air guiding blade is configured to guide air from the underbody flow to the front cooling fins. The rear air guiding blade is configured to guide air from the underbody flow to the rear cooling fins.

9 Claims, 3 Drawing Sheets

(56) References Cited

U.S. PATENT DOCUMENTS

2019/0107192 A1* 4/2019 Dahl .................. F16H 57/0416

FOREIGN PATENT DOCUMENTS

| | | |
|---|---|---|
| DE | 10350375 A1 | 6/2005 |
| DE | 102008009523 A1 | 8/2009 |
| DE | 112008003585 T5 | 12/2010 |
| DE | 102009043101 A1 | 3/2011 |
| DE | 102014016353 A1 | 6/2015 |
| DE | 102014106264 A1 | 11/2015 |
| DE | 202017101000 U1 | 4/2017 |
| DE | 102016125704 A1 | 7/2017 |
| DE | 102016102030 A1 | 8/2017 |
| JP | H 0576845 U | 10/1993 |

* cited by examiner

AIR-GUIDING DEVICE

CROSS REFERENCE TO RELATED APPLICATIONS

This application claims benefit to German Patent Application No. DE 10 2017 123 629.5, filed Oct. 11, 2017, which is hereby incorporated by reference herein.

FIELD

The present invention relates to a device for cooling a transmission unit, wherein the transmission unit has front cooling fins and rear cooling fins.

BACKGROUND

Cooling devices in which an air flow is guided via the components to be cooled are known in numerous embodiments from the prior art. For example, DE 103 50 375 A1 describes an adjustable cooling air inlet for an axle differential through which cooling air flows in on the underside of a vehicle. In DE 10 2008 009 523 A1, the air for cooling a drive train component is likewise picked up on the underside of a vehicle. Devices for picking up and guiding the cooling air are also known from DE 11 2008 003 585 T5, U.S. Pat. No. 5,927,384 A and JP H 05-76845U.

SUMMARY

In an embodiment, the present invention provides a device for cooling a transmission unit having front cooling fins and rear cooling fins. The device includes a front air guiding blade and a rear air guiding blade. The front air guiding blade is configured to guide air from the underbody flow to the front cooling fins. The rear air guiding blade is configured to guide air from the underbody flow to the rear cooling fins.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
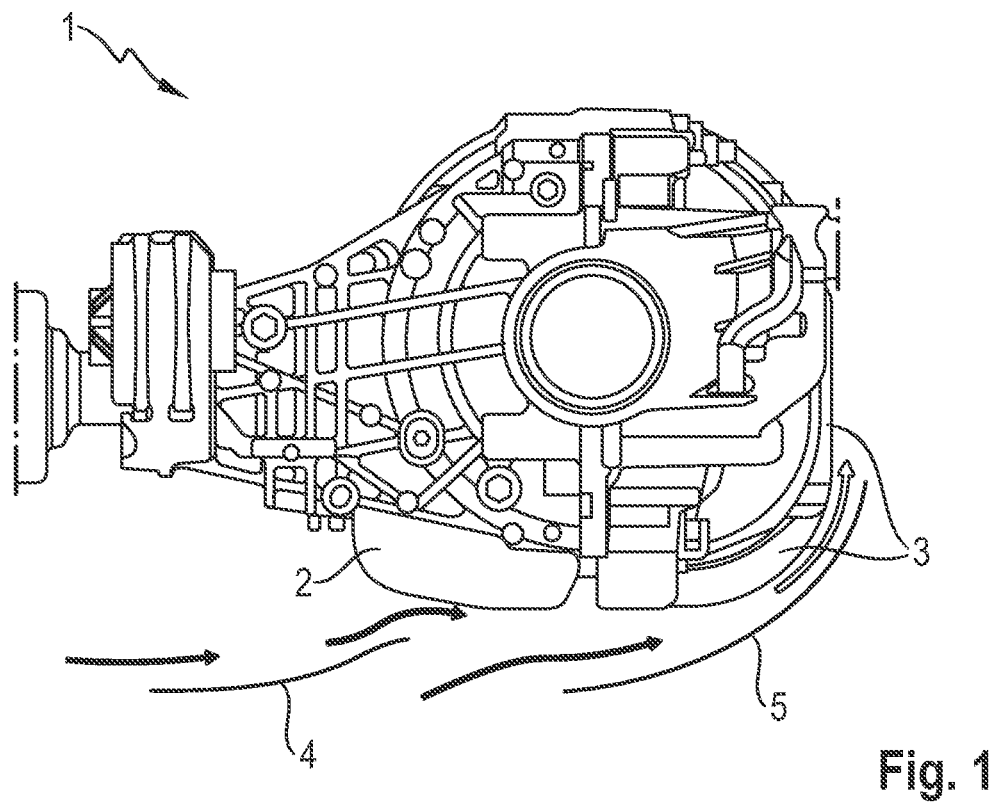
FIG. 1 schematically illustrates a device for cooling a transmission unit according to an embodiment of the present invention.

Embodiments of the present invention provide devices with which heat from a plurality of cooling fins of a vehicle engine can be transported away via a controlled air flow.

According to an embodiment, the present invention provides a device for cooling a transmission unit, wherein the transmission unit has front cooling fins and rear cooling fins, wherein the device comprises a front air-guiding blade and a rear air-guiding blade, wherein the front air-guiding blade is designed in such a manner that it guides air from the underbody flow to the front cooling fins, and the rear air-guiding blade is designed in such a manner that it guides air from the underbody flow to the rear cooling fins.

By means of this device, it is advantageously possible to use the air of the underbody flow for the cooling. The movement of the vehicle causes the ambient air to flow along the outer surfaces, in particular along the underside of the vehicle such that some of the flowing air can be branched off for the cooling in a simple manner by the air-guiding blades. Furthermore, it is possible by means of the two air-guiding blades arranged one behind the other to branch off two separate air flows and to guide them to different, spatially separate regions of the engine. For an advantageous realization of this concept, it is necessary for the two partial flows to be generated and guided in a manner such that swirling does not occur either between the partial flows or between the flows and the surfaces of the guiding system. Furthermore, it is of great importance for the picking up and outputting of the air to take place in a manner which does not unnecessarily increase the aerodynamic drag of the vehicle.

According to an embodiment of the invention, it is provided that the transmission unit has at least two regions with cooling fins which are arranged one behind the other with respect to the longitudinal axis of the vehicle. The respective front and rear region in the direction of travel can each be cooled here by one of the two partial flows which are produced by the two air-guiding blades which are likewise arranged one behind the other. According to an embodiment of the invention, it is preferably also possible for the air which is picked up by the front air-guiding blade to flow around both the front and rear cooling fins, and additionally for the air of the rear air-guiding blade to flow around the rear cooling fins. As a result, it is advantageously possible to configure the guiding system substantially only for one air flow, in which the flow from the front air-guiding blade is connected to that of the rear air-guiding blade, and the two partial flows are guided jointly to an outlet opening through which the cooling air is output again to the surroundings.

According to a preferred embodiment of the present invention, the profile of the front air-guiding blade has a concave and a convex region in the direction of travel. In a concave region located further to the front in the driving direction, the front air-guiding blade initially curves away upward from the horizontal such that the underside of the front air-guiding blade forms an indentation into which the air of the underbody flow flows. In a further convex region lying further to the rear in the direction of travel, the front air-guiding blade is subsequently curved again at least for a section toward the horizontal, preferably in such a manner that it runs at its rear edge substantially parallel to the underside of the vehicle. As a result, the air which has flowed into the indentation is steered in the horizontal direction. It is thereby possible in an advantageous manner for the air guided in such a manner to be steered directly into the rear air-guiding blade. The profile can therefore advantageously also be configured in such a manner that the concave and convex region simultaneously guide the air in the front air-guiding blade such that it flows substantially in a horizontal or only slightly inclined direction to the front cooling fins.

According to a further preferred embodiment of the invention, the rear and front air-guiding blades are arranged in such a manner that the lower edge of the rear and front air-guiding blades lie substantially at the same height. As a result, the lower edge of the rear blade does not project beyond the front blade and therefore advantageously does not contribute to an increase in the aerodynamic drag. In an embodiment in which the front air-guiding blade has the concave and convex regions described further above, the shape of the front blade can also produce a flow which guides the air of the underbody flow directly in the direction of the rear blade. This advantageously compensates for the fact that the rear blade lies in the flow shadow of the front blade with regard to a purely horizontal movement of air.

According to a further embodiment of the invention, the rear and front air-guiding blade are arranged in such a manner that the lower edge of the rear blade lies higher than the lower edge of the front blade. This is advantageous in particular in conjunction with an embodiment in which the underbody flow is drawn in the direction of the vehicle by the concave and convex regions of the front blade.

According to a further preferred embodiment of the invention, the front and rear air-guiding blades substantially form an integral component. As a result, the stability of the device is advantageously increased since the two blades have a common frame. Furthermore, advantages arise in the attaching of the device to the vehicle or to the transmission unit since the front and rear blade do not require separate fastenings. Furthermore, this variant according to the invention is preferred for manufacturing reasons since the double blade can be produced in one piece, for example from rolled metal, in a comparatively simple manner.

According to a further embodiment of the invention, the device has a plurality of fastening possibilities with which it can be attached to the vehicle or directly to the transmission unit. The fastening possibilities can be, for example, bores, with the aid of which the device can be screwed onto the transmission unit. For this purpose, the device preferably has a framework which positions the blades in a stable manner relative to the transmission unit. The framework can be integrated here into the device, or, together with the device, can essentially form one part.

According to one embodiment of the present invention, the device has a plurality of fastening possibilities, of which one or more are designed in such a manner that they can be fastened to the side of the transmission unit. According to a further embodiment of the invention, one or more of the fastening possibilities are designed in such a manner that they can be fastened to the underside of the transmission unit. A preferred embodiment of the invention consists in a combination of these two last-mentioned variants, and therefore the double blade can be fastened both laterally and also to the underside of the transmission unit. As a result, a fastening which is stable in relation to loads and at the same time good positionability of the double blade relative to the transmission unit are advantageously possible.

FIG. 1 depicts an air-guiding device for cooling a transmission unit 1, according to an embodiment of the present invention. The vehicle (not illustrated) moves here from right to left, and therefore the surrounding air flows around the vehicle from left to right. In the figure, the profiles of the front and rear air-guiding blades 4, 5 are depicted next to the transmission unit 1 of the vehicle. The two blades 4, 5 are fixedly connected here to the transmission 1 via a frame. The air flow is illustrated in the figure by arrows. The front air-guiding blade 4 picks up air from the underbody flow and guides it to the front cooling fins 2 where the air picks up the heat arising in the transmission 1 and transports it away.

The surface of the front air-guiding blade 4 first of all curves here away from the floor, i.e. forms a concave profile on the side of the air flowing through the blade 4. Over the further course, the profile is then curved in the opposite direction, giving rise to a convex region which forms a stretched S shape together with the concave region. By means of the S shape of the air-guiding blade 4, an indentation is produced on the underside, into which further air flows from the underbody flow, said air being brought together with the air flowing away from the front cooling fins 2. The two partial flows are picked up together by the rear air-guiding blade 5 and guided to the rear cooling fins 3.

The convex region of the S shape has the effect here that the air flowing through the front blade 4 approaches the front cooling fins 2 horizontally, or at a small angle with respect to the horizontal, such that the cooling air flows along the front cooling fins 2 and is then guided directly into the rear blade 5. Furthermore, the convex region steers the air flowing from the underbody flow in the direction of the rear blade 5 and additionally ensures that the two partial flows have a similar flow direction upon being brought together.

Figure 4:
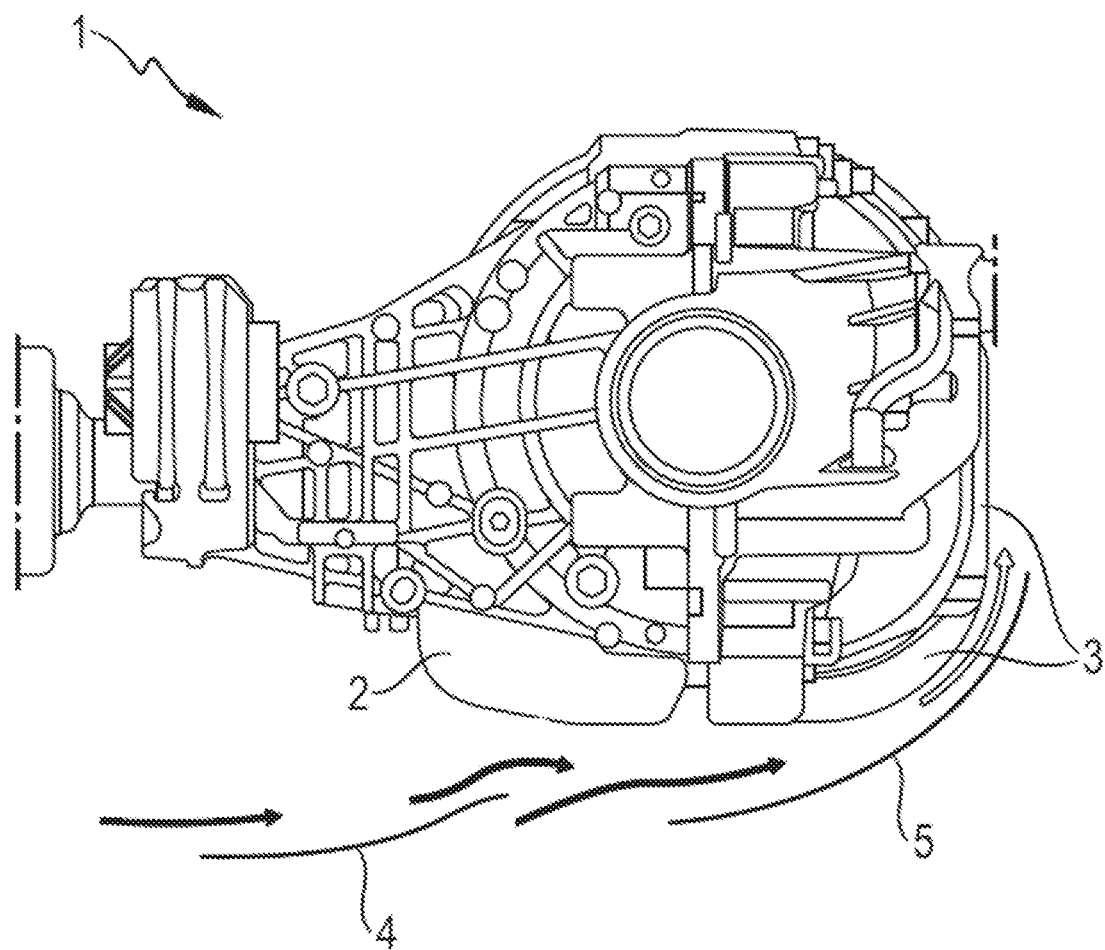
FIG. 4 schematically illustrates a device for cooling a transmission unit according to an embodiment of the present invention.

The flow dynamic effect by means of which the S shape of the front blade 4 draws the air of the underbody flow upward and therefore guides it into the rear blade 5 furthermore makes it possible for the lower edge of the front and rear blades 4, 5 to lie, as illustrated in FIG. 1, at the same height or, as illustrated in FIG. 4, with the lower edge of the rear blade above that of the first blade, i.e. for the rear blade 5 in particular not to project downward beyond the front blade 4. As a result, it is advantageously possible according to the invention for the air drawn upward in such a manner to flow to the rear blade 5 although the rear blade 5 lies in the flow shadow of the front blade 4 with respect to the horizontal underbody flow. The rear blade 5 thus does not project here into the horizontal flow, as a result of which the aerodynamic drag of the device is advantageously kept low.

In the figure, the rear cooling fins 3 are attached at two points. In addition to the cooling fins 3 at the lower rear end of the transmission unit, an additional cooling fin region 3 on the rear side of the transmission can be seen in the figure, which is likewise approached by the flow because of the shape of the rear blade 5 and is cooled.

Figure 2:
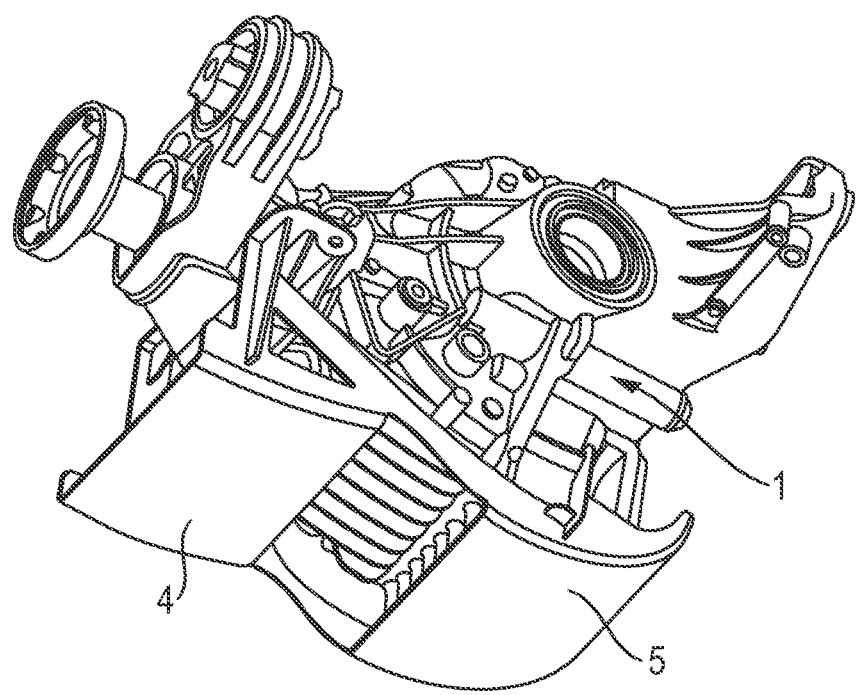
FIG. 2 schematically illustrates an air guiding device attached to the transmission unit according to an embodiment of the present invention.

FIG. 2 illustrates an air-guiding device attached to the transmission unit 1, according to an embodiment of the present invention. The device is formed by an integral component which comprises a front and rear air-guiding blade 4, 5 and a frame with a plurality of fastening possibilities. The air-guiding device and the transmission unit 1 are depicted here from a perspective obliquely from below. The two blades 4, 5 are arranged one behind the other and thus produce the flow profile described further above for cooling the transmission unit 1. The device is connected directly to the transmission unit 1 via frame elements, wherein the frame elements have bores with which the device can be screwed on at suitable points of the transmission unit 1. As a result, the position and orientation of the blades 4, 5 is advantageously fixed relative to the transmission unit 1 in such a manner that the desired flow profile arises.

Figure 3:
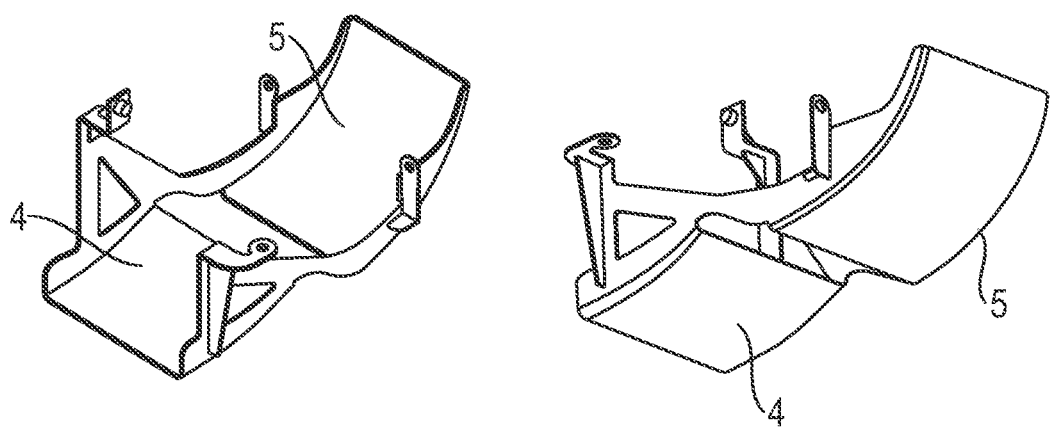
FIG. 3 schematically illustrates two different views of the air guiding device according to an embodiment of the present invention.

FIG. 3 depicts two different perspectives of the air-guiding device. On the left side, the device is illustrated obliquely from above while the right side corresponds to a perspective obliquely from below. The embodiment corresponds again to the design which is depicted in FIG. 2 and in which, in addition to the front and rear air-guiding blades 4, 5, an integral component comprises a frame with a plurality of fastening possibilities. The fastening possibilities illustrated are arranged in such a manner that the air-guiding device can be fastened both to the underside and to a side wall of the transmission unit 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for cooling a transmission unit, the transmission unit having front cooling fins and rear cooling fins, the device comprising:
   a front air-guiding blade; and
   a rear air-guiding blade,
   wherein the front air-guiding blade is configured to guide air from an underbody flow to the front cooling fins,
   wherein the rear air-guiding blade is configured to guide air from the underbody flow to the rear cooling fins, and
   wherein the front air-guiding blade has a convex and a concave region.

2. The device as claimed in claim 1, wherein the front air-guiding blade is further configured to guide air from the underbody flow to the rear cooling fins.

3. The device as claimed in claim 1, wherein a lower edge of the rear air-guiding blade is arranged in a vertical direction at a same height as a lower edge of the front air-guiding blade.

4. The device as claimed in claim 1, wherein the front air-guiding blade and the rear air-guiding blade are formed substantially integrally.

5. The device as claimed in claim 1, wherein the device has a plurality of fastening points which are configured to be fastenable to the vehicle or transmission unit.

6. The device as claimed in claim 5, wherein at least one of the plurality of fastening points is configured to be fastenable to a laterally arranged wall of the transmission unit.

7. The device as claimed in claim 5, wherein at least one of the plurality of fastening points is configured to be fastenable to a lower side of the transmission unit.

8. A device for cooling a transmission unit, the transmission unit having front cooling fins and rear cooling fins, the device comprising:
   a front air-guiding blade; and
   a rear air-guiding blade,
   wherein the front air-guiding blade is configured to guide air from an underbody flow to the front cooling fins,
   wherein the rear air-guiding blade is configured to guide air from the underbody flow to the rear cooling fins,
   wherein a lower edge of the rear air-guiding blade is arranged in a vertical direction above a lower edge of the front air-guiding blade.

9. A device for providing cooling to a transmission unit of a vehicle, the transmission unit having front cooling fins and rear cooling fins arranged one behind the other with respect to a longitudinal axis of the vehicle oriented by a direction of travel, the device being configured to attach to the transmission unit at an underside of the vehicle, the device comprising:
   a front air-guiding blade; and
   a rear air-guiding blade arranged behind the front air-guiding blade with respect to the direction of an underbody flow,
   wherein the front air-guiding blade is configured to guide air from the underbody flow to the front cooling fins,
   wherein the rear air-guiding blade is configured to guide air from the underbody flow to the rear cooling fins,
   wherein the front air guiding blade has a profile with a concave region and a convex region, the concave region being located in front of the convex region, the convex region being at a portion of the front air guiding blade configured to be arranged closer to the transmission unit.

* * * * *